Figure 6:
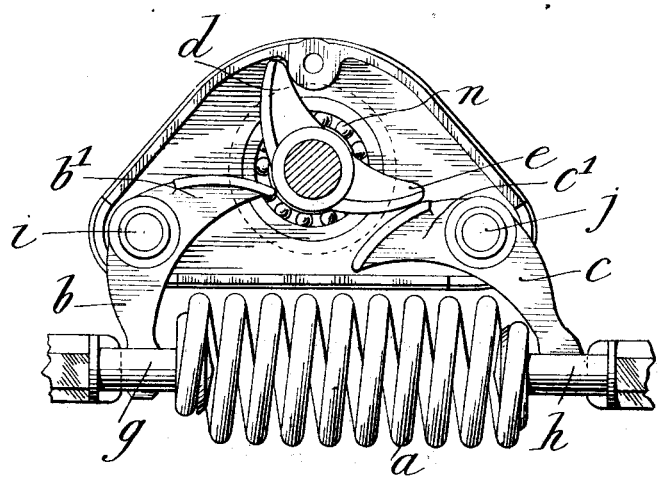

May 5, 1925.                                                1,536,728
A. W. REEVES
SPRING SUSPENSION ARRANGEMENT
Filed Nov. 29, 1921                    3 Sheets-Sheet 1
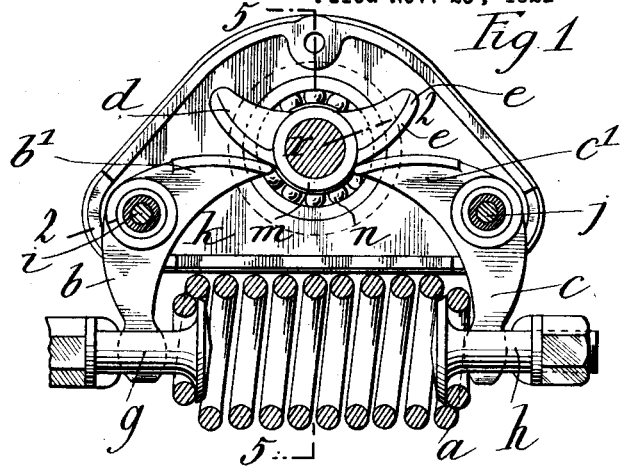
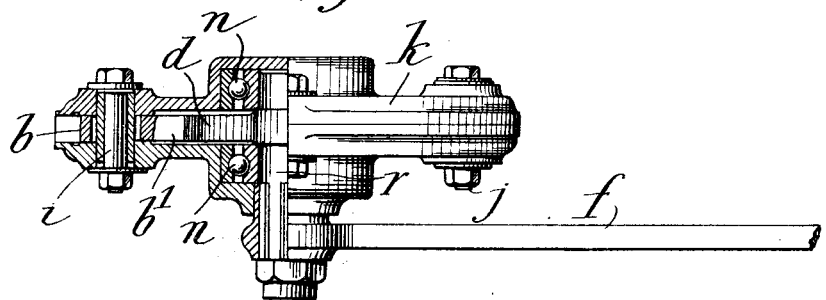
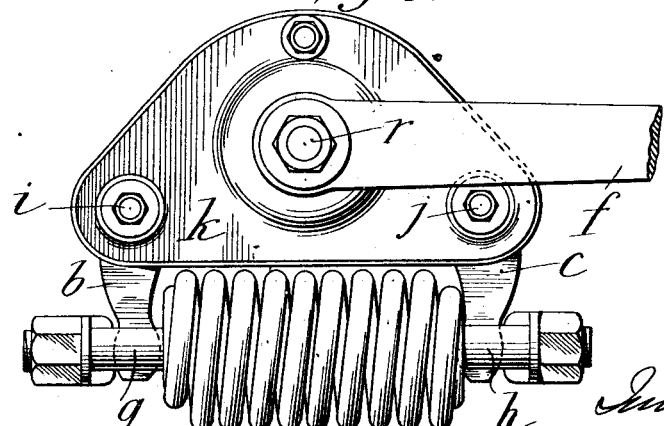
Inventor
Arthur William Reeves
By Julian C Dowell
his attorney May 5, 1925.  1,536,728
A. W. REEVES
SPRING SUSPENSION ARRANGEMENT
Filed Nov. 29, 1921  3 Sheets-Sheet 2
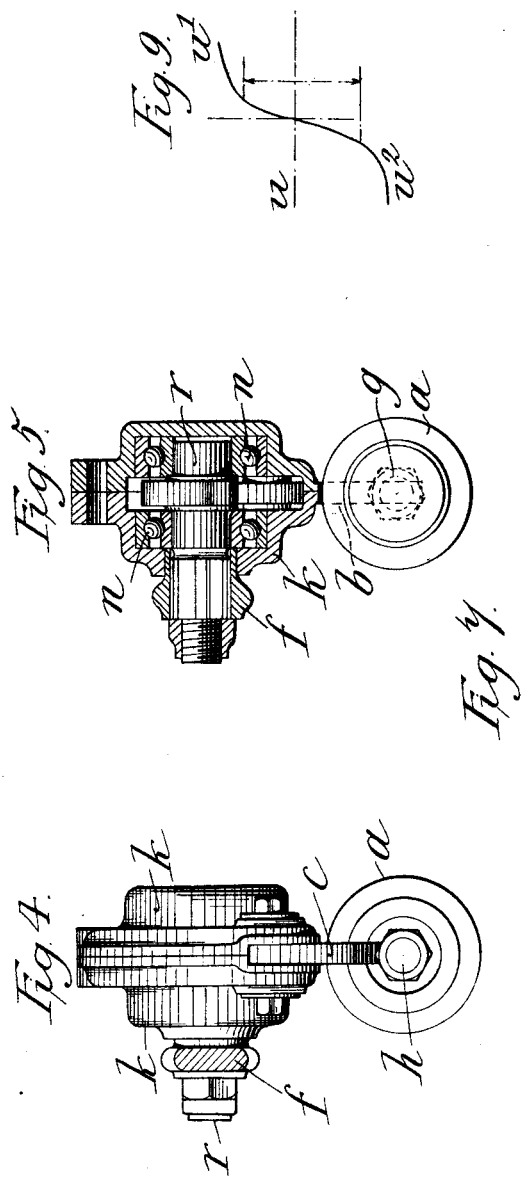
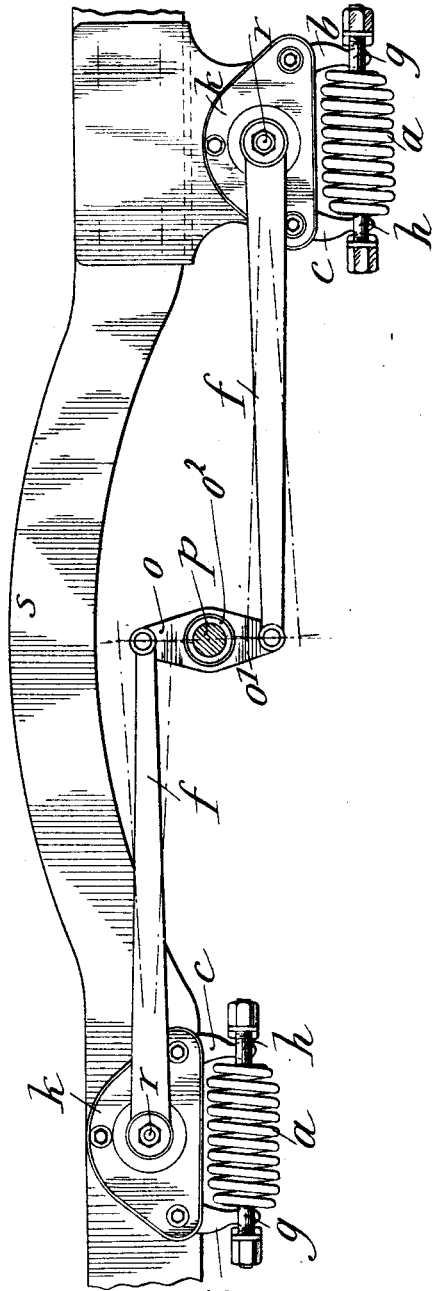

May 5, 1925. 1,536,728
A. W. REEVES
SPRING SUSPENSION ARRANGEMENT
Filed Nov. 29, 1921 3 Sheets-Sheet 3

Patented May 5, 1925.

1,536,728

UNITED STATES PATENT OFFICE.

ARTHUR WILLIAM REEVES, OF ALVECHURCH, ENGLAND.

SPRING SUSPENSION ARRANGEMENT.

Application filed November 29, 1921. Serial No. 518,658.

*To all whom it may concern:*

Be it known that I, ARTHUR WILLIAM REEVES, a subject of the King of Great Britain and Ireland, residing at Alvechurch, in the county of Worcester, England, have invented Improvements in or Relating to Spring Suspension Arrangements, of which the following is a specification.

This invention has for its object improvements in spring suspension arrangements specially suitable for road vehicles, more particularly for motor road vehicles, but applicable also for other purposes, as for instance the landing wheels and associated parts of air craft, hereinafter included in the term vehicle.

For this purpose, a spring suspension arrangement suitable for use between the axle and chassis or body of a vehicle comprises, according to the present invention, the ends of a coiled spring are arranged to be differentially acted upon by variably acting lever mechanism so constructed, arranged and adapted to operate, that the action of such spring suspension arrangement is variably progressive in such manner that great flexibility and resilience are obtained and maintained over a normal working range of vertical axle movement relatively to the chassis or body of the vehicle (hereinafter called the chassis) when normal loads are being dealt with, and, as the deflection or rebound of the spring or springs is increased, consequent on irregularities in the road surface and the inertia of the vehicle, the spring resistance to such deflection or rebound is automatically increased at a quicker rate than the rate of increase of the load or rebound force. A load deflection diagram of such a spring suspension arrangement will consequently show that over the normal working range, there is great flexibility of the spring or springs but beyond that range, both on the extension and rebound movements, the diagram will show that the spring resistance rapidly increases so as gradually to reduce and ultimately arrest further deflection or undue rebound, this latter action being accomplished with a practically uniform deceleration, thus avoiding any undue shock or jerk being transmitted to the chassis and body of the vehicle and the occupants of the latter.

In this way the efficiency of the spring device or devices used can be maintained practically constant within a wide range of road irregularities and will, approximately, automatically adjust itself to any load within the range of the spring suspension arrangement adopted. Also, the normal period of oscillation of the suspension spring arrangement can be adjusted to any desired degree whilst at the same time retaining the uniform deceleration above referred to.

Thus, it will be understood that the extension or compression of the spring or springs used in a spring suspension arrangement according to the invention, is not uniformly in direct ratio to the increase in load or relative vertical movement between the chassis and axle of the vehicle, but is such that a load extension diagram of such an arrangement does not, as with a directly connected spring or springs, follow a straight line law but, on the contrary, follows approximately a parabolic law.

Spring suspension arrangements adapted to act in the manner described can be variously constructed.

Figure 8:
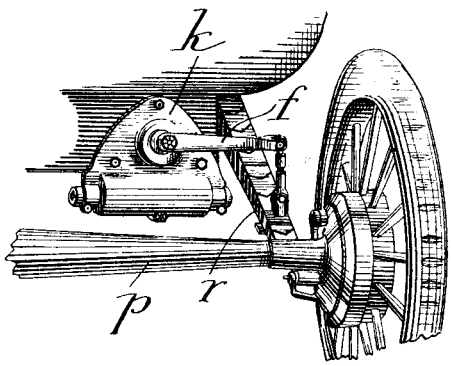

In the accompanying illustrative drawings, Fig. 1 shows partly in side elevation and partly in longitudinal section, and Fig. 2 partly in plan and partly in horizontal section on the line 2—2 of Fig. 1, one construction of spring suspension arrangement according to the invention. Figs. 3 and 4 show such spring suspension arrangement in side and end elevation respectively. Fig. 5 is a cross section thereof on the line 5—5 of Fig. 1 with part in end elevation. Fig. 6 is a similar view to Fig. 1 but showing some of the parts in a different position. Fig. 7 shows, diagrammatically, the application of two spring arrangements of the kind illustrated to the chassis and an axle of a vehicle. Fig. 8 is a perspective view showing a spring suspension arrangement according to Figs. 1 to 6 inclusive combined with a laminated spring. Fig. 9 shows a load deflection curve of a spring suspension arrangement of the kind referred to.

The spring suspension arrangement may advantageously comprise a helical spring $a$ connected at its ends to two oppositely arranged bell cranked levers $b$ $b^1$ and $c$, $c^1$ arranged to be controlled and differentially acted upon by two lever arms $d$ and $e$ connected to another lever arm $f$ common to them and adapted to be connected to and operated from an axle of the vehicle to which the spring suspension arrangement is applied. The arrangement is such that under normal load conditions, the spring $a$ is held in tension between the two oppositely arranged levers $b\ b^1$ and $c,\ c^1$, under the control of the two lever arms $d$ and $e$, so as to give great flexibility over the normal working range of load but upon undue relative upward and downward movement taking place between the chassis and axle of the vehicle, the two oppositely arranged levers $b\ b^1$ and $c\ c^1$ will be so acted upon by the lever arms $d$ and $e$, as shown in Fig. 6, that they will be caused to act in a differential manner upon the ends of the spring $a$ so that the resistance of the spring will then act in a rapidly increasing manner to check such movements.

In the particular construction of spring suspension arrangement shown in the drawings, a horizontally arranged helical spring $a$ is used connected at its ends to two bolts $g$ and $h$ with which are engaged the downwardly extending arms $b$ and $c$ of two bell crank levers $b\ b^1$ and $c\ c^1$ journalled at $i$ and $j$ respectively in a casing $k$ adapted to be fixed to the chassis of a vehicle. The upper arms $b^1$ and $c^1$ of the two levers extend towards each other and are arranged below two opposite outwardly and upwardly extending lever arms $d$ and $e$ carried by a centrally arranged spindle $m$ journalled, it may be, in roller bearings $n$ in the casing $k$, the inwardly and outwardly extending arms being arranged in pairs $b^1\ d$ and $c^1\ e$ and made of convex shape so that they can roll the one on the other. To the spindle $m$ carrying the outwardly and upwardly extending arms $d$ and $e$, which are hereinafter called for distinction lobes, is fixed one end of a long lever arm $f$ the opposite end of which is adapted to be connected to a lug $o$ on the axle $p$ (Fig. 7) of a vehicle so as to be controlled and operated thereby. The lever arm $f$ may conveniently be fixed to the outer end of a spindle $r$ to the inner end of which the spindle $m$ is fixed.

The relative curvatures of the lobes $d$ and $e$ and of the inwardly extending arms $b^1$ and $c^1$ of the bell crank levers $b\ b^1$ and $c\ c^1$ are such that under normal working conditions they will cause the spring $a$ to offer a practically uniform increasing and decreasing resistance to relative upward and downward movements of the vehicle chassis $a$ and axle $p$ (Fig. 7), as shown by the intermediate portion $u$ of the load deflection curve shown in Fig. 9, but will offer rapidly increasing resistance to undue movement in each direction beyond the normal movements, as shown by the portions $u^1$ and $u^2$ of such curve, one bell crank lever moving to a different extent to the other, as shown in Fig. 6, so as to cause a differential movement of the two ends of the spring.

Two spring suspension arrangements of the kind hereinbefore described may, as shown in Fig. 7, be used with each axle $p$ of a vehicle, the long lever arms $f$ of the two arrangements being jointed to upper and lower lugs or the upper and lower portions $o$ and $o^1$ of a collar $o^2$ on the axle, so as in effect to form a parallel motion arrangement.

As the elements of a suspension spring arrangement of the kind hereinbefore described are of comparatively small mass, and the inertia forces are therefore of small magnitude, they are permitted, after displacement, to return very rapidly to normal position in readiness to deal with a succeeding shock or jerk. As a result, any tendency to amplification of the natural period of oscillation is automatically checked, so that the said spring suspension arrangement possesses great capacity for dissipating rapidly recurring shocks at high velocity of the vehicle.

It will also be understood that since the arrangement described constitutes a spring device having of necessity a constantly varying frequency of oscillation, it therefore becomes automatically self damping against any tendency to amplification of oscillation and this without the introduction of mechanical friction, which would detract from the resilience of the spring. Thus, whilst the natural period of oscillation of the spring arrangement may be of a low order, say sixty to eighty oscillations per minute over the normal working range of relative movement between the chassis and axles of a vehicle, the period of oscillation will be rapidly increased towards the two extreme limits of oscillation, owing to the rapid stiffening of the spring arrangement towards the extreme limits of deflection of the spring arrangement, so as to resist excessive deflection and rebound. In this way the load deflection curve of a spring suspension arrangement according to the invention, embodying steel springs, may approximate the load deflection curve of a suspension system embodying india rubber springs.

Furthermore, helical spring suspension arrangements according to the invention enable all frictional damping effects, such as are inherent to laminated plate springs, to be dispensed with, and also avoid the use of resistance effects such as are obtained by causing oil or other liquid to be forced through orifices of fixed or variable cross sectional area, and thus, at the same time, avoid the instability of action consequent on variation of viscosity of the liquid used.

Spring suspension arrangements of the kind hereinbefore described can be alone used to support the chassis and body of a vehicle, but they can, if desired, advantageously be used in conjunction with the laminated plate spring suspension means commonly used in road vehicles, the stress strain diagram of which, considered alone, is a straight line. Fig. 8 shows a spring suspension arrangement of the kind hereinbefore described combined with a laminated plate suspension arrangement, the lever *f* of the former arrangement being in this example connected to one end portion of a laminated spring *r* that is connected to the axle *p* of the vehicle. In this case the resultant stress strain diagram will be of the character hereinbefore mentioned, taking the form of two parabolic curves extending the one into the other and inverted the one in relation to the other. The new suspension spring means, acts in this case, at certain points of deflection of the main or laminated spring *r*, to, in effect, stiffen such spring and thus increases its action, whilst at other points it acts reversely, that is to say, to, in effect, reduce its action. At all times however the work done on the auxiliary spring suspension means, is afterwards returned without appreciable loss. The compound spring suspension arrangements may however be such as to give a resultant stress-strain diagram of other desired forms.

The arrangement is in each case such as to impart easy riding qualities to the vehicle without any violent acceleration or deceleration, either on maximum deflection of the springs, or on rebound thereof.

What I claim is:—

1. A spring arrangement suitable for use between two relatively movable bodies, said arrangement comprising two sets of differentially acting levers adapted to be connected to one of said bodies and arranged to be moved in opposite directions from a normally stationary position, a spring arranged to be strained from one or the other end thereof by movement of one or the other of said sets of levers from its normal position the other set of levers being then adapted to prevent movement of the other end of said spring and means adapted to be connected to the second body and to move one or the other of said sets of levers from its normal stationary position.

2. A spring suspension arrangement suitable for use between the chassis and an axle of a vehicle, said arrangement comprising a support adapted to be connected to the vehicle chassis, two levers pivoted to said support and each movable in one direction only from a stationary normal position, a spring arranged to be acted upon axially in one or other direction by one or the other of the two levers, two connected levers adapted when turned in one or the other direction from a normal position to act in a differential manner upon one or the other of the first mentioned levers and means adapted to be connected to the axle of the vehicle and by movement thereof in one or the other direction relatively to said chassis, to move the two connected levers in one direction or the other and thereby cause one or the other of the first mentioned levers to act against one end of the spring whilst the other of the two first mentioned levers remains in its normal stationary position and prevents movement of the other end of the spring.

3. A spring suspension arrangement suitable for use between the chassis and an axle of a vehicle, said arrangement comprising a support adapted to be connected to the chassis of the vehicle, two levers pivoted to said support, means adapted to hold said levers normally in a stationary position, a coiled spring arranged between and adapted to be acted upon endways in opposite directions by said levers, two connected normally stationary levers having a common axis of movement and adapted when moved in one or the other direction from the normal position to act in a differential manner upon one or other of the two first mentioned levers and cause the same to act upon the corresponding end of the spring and means adapted to be connected to the axle of the vehicle and to rock the second pair of levers in one direction or the other from the normal position upon relative movement between the chassis and axle taking place.

4. A spring suspension arrangement comprising a coiled spring, levers adapted to be moved from a normal stationary position and to act in opposite directions against the ends of said spring, other levers adapted to move in opposite directions from a central and normal position and to act in a variable manner at different parts of their movement upon one or other of the first mentioned levers and means for operating the secondly mentioned levers in one or the other direction.

5. A spring suspension arrangement comprising a support adapted to be fixed to one of two bodies between which relative motion is liable to occur, a coiled spring carried by said support, a pair of levers adapted to act in opposite directions on said spring, a pair of lever arms adapted to operate alternately in opposite directions from a central or normal position and in a differential manner on the first mentioned levers, and means adapted to be operated from the second movable body for operating the second pair of levers alternately in opposite directions.

6. A spring suspension arrangement comprising a support adapted to be fixed to one of two bodies between which relative motion is liable to occur, a pair of bell crank levers pivoted to said support, a coiled metal spring arranged between and connected to opposite arms of the bell crank levers, a pair of lever arms adapted to act alternately on the other arms of the said bell crank levers, and means for rocking the said pair of lever arms from the second movable body.

7. A spring suspension arrangement comprising a support adapted to be fixed to one of two bodies between which relative motion is liable to occur, a coiled spring carried by said support, a pair of levers adapted to act in opposite directions upon said spring, a second pair of levers adapted to move alternately in opposite directions from a central or normal position and to roll alternately against each of the levers of the first mentioned pair of levers, and means adapted to be connected to the second movable body for rocking the secondly mentioned pair of levers.

8. A spring suspension arrangement comprising a casing, two bell crank levers journalled therein, two of the arms of said levers extending in the same direction, and the other arms of said levers extending towards each other and having curved bearing surfaces, a coiled metal spring arranged between and connected to the first mentioned pair of lever arms, a pair of oppositely extending lever arms having curved bearing surfaces adapted to act against the free ends of the second arms of the bell crank levers and means for rocking the oppositely extending pair of lever arms alternately in opposite directions from a central or normal position.

Signed at London, England, this tenth day of November, 1921.

ARTHUR WILLIAM REEVES.